(12) United States Patent
Smith

(10) Patent No.: US 7,887,769 B1
(45) Date of Patent: Feb. 15, 2011

(54) METHOD OF REMOVING SULFUR DIOXIDE FROM FLUE GASES AND TREATMENT OF OXIDIZED EFFLUENT THEREFROM

(75) Inventor: Kevin J. Smith, Monongahela, PA (US)

(73) Assignee: Carmeuse Lime, Inc., Pittsburgh, PA (US)

(*) Notice: Subject to any disclaimer, the term of this patent is extended or adjusted under 35 U.S.C. 154(b) by 0 days.

(21) Appl. No.: 12/592,665

(22) Filed: Dec. 1, 2009

(51) Int. Cl.
*B01D 53/50* (2006.01)
*C01F 11/46* (2006.01)

(52) U.S. Cl. .................. 423/243.01; 423/243.08; 423/244.07; 423/555; 423/164

(58) Field of Classification Search ............ 423/243.01, 423/243.08, 244.07, 555, 164
See application file for complete search history.

(56) References Cited

U.S. PATENT DOCUMENTS

| | | | | |
|---|---|---|---|---|
| 3,637,347 A | * | 1/1972 | Jonakin et al. | 423/243.08 |
| 3,785,840 A | | 1/1974 | Minnick et al. | 106/118 |
| 4,925,614 A | * | 5/1990 | Gebhard | 264/232 |
| 4,931,264 A | * | 6/1990 | Rochelle et al. | 423/244.01 |
| 5,084,255 A | | 1/1992 | College et al. | 423/242 |
| 5,560,894 A | * | 10/1996 | Ueno et al. | 423/239.1 |
| 5,645,807 A | | 7/1997 | College et al. | 423/243.1 |
| 6,099,816 A | * | 8/2000 | College et al. | 423/243.08 |
| 6,187,277 B1 | * | 2/2001 | Kirschner | 423/220 |
| 6,572,832 B2 | | 6/2003 | Smith | 423/243.08 |
| 7,179,438 B2 | | 2/2007 | Jones | 423/243.08 |
| 7,628,969 B2 | * | 12/2009 | Holmes et al. | 423/242.1 |

FOREIGN PATENT DOCUMENTS

JP 5-146635 A * 6/1993

* cited by examiner

*Primary Examiner*—Timothy C Vanoy
(74) *Attorney, Agent, or Firm*—Kratz, Quintos & Hanson, LLP

(57) ABSTRACT

A method of removing sulfur dioxide from flue gases using calcium and magnesium scrubbing components and treatment of oxidized effluent from such a system includes passing classified oxidized effluent to a regeneration tank and adding lime to produce a regenerator discharge containing magnesium hydroxide, gypsum and crystalline inert material. Gypsum is separated from the discharge and a magnesium hydroxide stream passed to a concentration system to produce a concentrated solids stream of magnesium hydroxide, residual minor amount of gypsum and crystalline inert material. A portion of the resultant stream is returned to the sulfur dioxide removal system while a portion is passed to the oxidizer. Further portions may be fed to a power plant boiler or to the flue gas stream between a solids collection device and the wet scrubber.

18 Claims, 2 Drawing Sheets

METHOD OF REMOVING SULFUR DIOXIDE FROM FLUE GASES AND TREATMENT OF OXIDIZED EFFLUENT THEREFROM

BACKGROUND OF THE INVENTION

The use of wet scrubbing processes to remove sulfur dioxide from gaseous streams, such as those resulting from power plant combustion systems, has been proposed using calcium scrubbing components such as calcium oxide (lime) or calcium carbonate (limestone). An advantageous such process adds a magnesium scrubbing component and is generally labeled as a magnesium-enhanced scrubbing process.

In calcium-based slurry wet scrubbing processes, inert material is present in the starting lime or limestone that causes problems in later processing, since such inert material is non-reacted in the scrubbing process and usually contains a large amount of silicon, iron and aluminum oxides.

Such inert material is generally crystalline in nature before and after slaking with water to form a slurry for use in the scrubbing process and after introduction into the wet scrubbing system. In such a crystalline form, even after being exposed to slaking reactions and reactions of magnesium and calcium scrubbing components with hydrochloric acid and sulfur dioxide present in a gaseous stream, the solid nature of the inert material enables eventual removal thereof from a sulfur dioxide scrubbing system along with other waste solids without the need for special and costly techniques.

Where magnesium-enhanced calcium scrubbing components are used in wet processes for flue gas desulfurization (FGD), however, and recovery of magnesium hydroxide from the spent scrubbing slurry is made, problems arise with such inert material.

In magnesium-enhanced lime FGD processes similar to that described in U.S. Pat. No. 5,645,807 or U.S. Pat. No. 6,572,832, the contents of both patents being incorporated by reference herein, that employ an oxidation operation separate from the scrubber, the inert material of the original reagent changes to a more amorphous solid structure that becomes extremely difficult to concentrate and purge from the FGD process. Current forced oxidization magnesium-enhanced lime FGD processes have been required to employ complicated and expensive techniques to concentrate, purge and dispose of such inert material.

As the forced oxidized magnesium-enhanced lime FGD process has undergone development beyond the form described in U.S. Pat. No. 6,572,832, it has been found that lime inerts in the amorphous form, caused from exposure to the oxidation step, can be made to revert back to a more crystalline nature if subsequently exposed to a pH of greater than 9.0. The exact mechanism of change, extent of change and rate of change as a function of pH, is yet to be fully determined, however the conditions present in the regeneration tank of the magnesium-enhanced lime FGD byproduct recovery process as described in U.S. Pat. No. 5,084,255 (the contents of which are incorporated by reference, herein), and U.S. Pat. No. 6,572,832 provides an environment where amorphous lime inerts can revert to crystalline structure.

Efforts to remove the amorphous lime inerts (an orange colored fluffy-like material) from magnesium-enhanced lime FGD systems currently involve siphoning the material off from a gypsum fines thickener at an elevation that is above the bed of gypsum fines where amorphous fines are mostly located. The amorphous fines are directed to a separate thickener where a flocculating agent is added to assist settling. At best, such amorphous inerts may settle in the separate thickener to a density of between 5 and 10-wt % before being pumped to centrifuges. More flocculating agent is added to the amorphous inert material slurry that is fed to a centrifuge to assist in further concentrating the amorphous solids to around 20 to 30-wt % density. The resulting concentrated amorphous solid is sloppy and barely able to be handled so that it can be transported to a pug mill where flyash and lime or lime kiln dust is added to create a pozzolonic mixture that can be hauled to landfill with a dump truck. Alternatively a plate and frame pressure filter can be used in place of the centrifuge to concentrate to 40-wt % solids density but the resulting filter cake still needs to be mixed with flyash and lime or lime kiln dust before being landfilled.

Such a concentrating process uses a large quantity of flocculating agent and is labor intensive and expensive.

SUMMARY OF THE INVENTION

A method for removal of sulfur dioxide from a gaseous stream, such as a flue gas stream of a power plant, is provided using a wet scrubber and an aqueous scrubbing slurry containing a magnesium scrubbing component and a calcium scrubbing component, such as lime or limestone, with inert material in crystalline form, where calcium and magnesium sulfites and sulfates are formed, and the calcium sulfites and magnesium sulfites are oxidized in an oxidizer to produce an oxidized effluent containing magnesium sulfate and calcium sulfate dihydrate (gypsum), along with the crystalline inert material which inert material has been converted to an amorphous inert material, and oxidized effluent is clarified to remove a major portion of the gypsum and produce a clarified oxidized effluent.

The clarified oxidized effluent is passed to a regeneration tank and lime slurry added thereto to produce magnesium hydroxide and gypsum and wherein the amorphous inert material is converted back to a crystalline material. A regenerator discharge results that contains magnesium hydroxide, gypsum and crystalline inert material.

The regenerator discharge is passed to a separation tank where a substantial amount of gypsum is separated therefrom and a separated stream is provided containing magnesium hydroxide, a residual minor amount of gypsum, and crystalline inert material. The separated stream is then passed to a concentration system, such as stacked membrane filters, to produce a concentrated solids stream containing a mixture of magnesium hydroxide, residual minor amount of gypsum and crystalline inert material. A portion of the concentrated solids stream is passed to the magnesium-enhanced calcium slurry sulfur dioxide removal process while a remaining portion thereof is passed to the oxidizer.

In the most preferred method, a further remaining portion of the concentrated solid stream containing magnesium hydroxide, residual minor amount of gypsum and crystalline inert material is fed to a power plant boiler either for reaction with sulfur trioxide therein or for slag control, or is fed to a flue gas stream between a solids collection device, such as an electrostatic precipitator or a bag house, and a wet scrubber for reaction with sulfur trioxide in a flue gas stream.

A method is also provided for treating a bleed stream from a magnesium-containing portion of an oxidized effluent, of a magnesium-enhanced calcium slurry sulfur dioxide removal process, from an oxidizer, where the oxidized effluent is clarified and contains magnesium sulfate, and up to about three weight percent of amorphous inert material and gypsum fines, and the oxidized effluent is passed to a regeneration tank and lime slurry added to produce magnesium hydroxide and gypsum and convert the amorphous inert material to a crystalline inert material and produce a regenerator discharge containing magnesium hydroxide, gypsum and crystalline inert material. The regenerator discharge is passed to a separation tank where a substantial amount of gypsum is separated therefrom and a separated stream is provided containing magnesium hydroxide, a residual minor amount of gypsum, and crystalline inert material. The separated stream is passed to a concentration system, such as stacked membrane filters, to produce a concentrated solids stream containing a mixture of magnesium hydroxide, residual minor amount of gypsum and crystalline inert material. A portion of the concentrated solids stream is returned to the magnesium-enhanced calcium slurry sulfur dioxide removal process while passing a remaining portion thereof to the oxidizer.

In addition, or in place of, the return of the remaining portion of the concentrated stream to the oxidizer, a portion thereof may be fed to a power plant boiler for reaction with sulfur trioxide therein or for slag control, or the portion may be fed to a flue gas stream between a solids collection device, such as an electrostatic precipitator and a baghouse, and a wet scrubber to react with sulfur trioxide present in a gaseous stream.

BRIEF DESCRIPTION OF THE DRAWINGS

The invention will become more readily apparent by reference to the following description of a preferred embodiment, by way of example only, in the accompanying drawings, wherein.

DETAILED DESCRIPTION

The present invention provides a method of removing sulfur dioxide from a flue gas stream of a power plant boiler using a wet scrubber, and a method for treating a bleed stream from a magnesium-containing portion of an oxidized effluent from an oxidizer, resulting from a magnesium-enhanced calcium slurry sulfur dioxide removal process, the oxidized effluent containing magnesium sulfate, gypsum and amorphous inert material.

Figure 1:
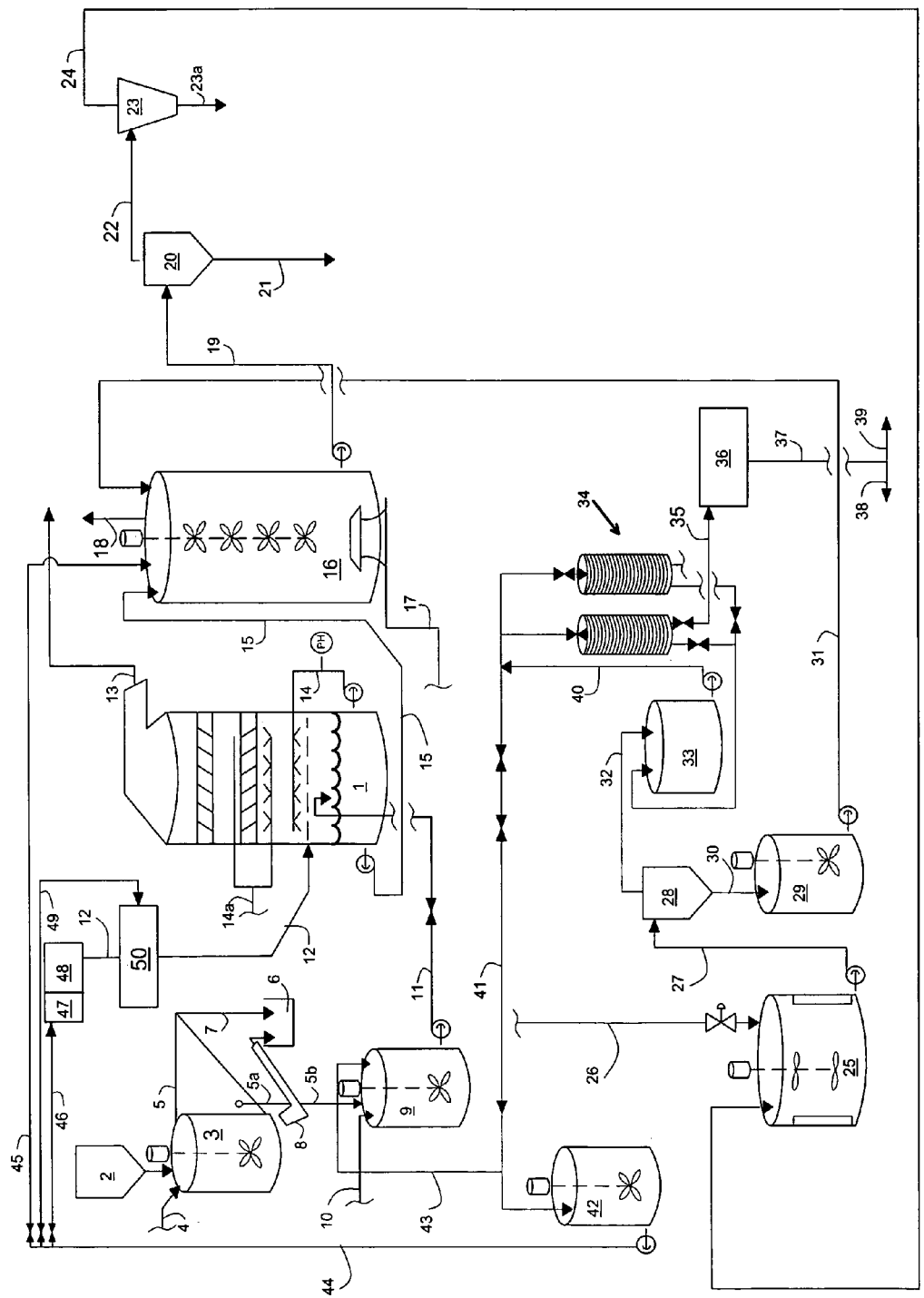
FIG. 1 is a flow diagram illustrating the present method of removing sulfur dioxide from a flue gas stream of a power plant.

Referring now to FIG. 1, as shown therein, an aqueous scrubbing slurry is contacted with a sulfur dioxide-containing gas in a wet scrubbing unit 1, so as to remove sulfur dioxide therefrom. The aqueous scrubbing slurry contains magnesium scrubbing components, and an especially useful slurry contains magnesium-enhanced lime. Lime or limestone may be used, although the following description will describe the use of lime as the calcium scrubbing component. Such a general process is described in U.S. Pat. No. 5,645,807 to Tseng et al., and U.S. Pat. No. 6,572,832 to the present inventor.

A lime slurry containing magnesium scrubbing components is fed from a source 2 to a slaker 3 and water added through line 4 to form an aqueous lime slurry. The aqueous lime slurry containing magnesium scrubbing components is passed to a separator 5 so as to remove larger size solids, with undesired large particles passed to a grit box 6 through line 7. The slaked lime slurry is passed through line 5a to a further separator 8, such as a screen conveyor, where additional large solid particles we removed and fed to the grit box 6 while the slaked lime is fed from line 5b to a storage tank 9. Water for dilution is fed to the storage tank 9 though line 10 to produce an aqueous slurry containing magnesium and calcium components for charging to the wet scrubber 1 through line 11. A flue gas stream containing sulfur dioxide is fed through line 12 to the wet scrubber 1 wherein the magnesium and calcium scrubbing components remove sulfur dioxide from the gaseous stream, with scrubbed gas exiting the wet scrubber through line 13. A recycle line 14 recycles scrubbing slurry to the scrubber 1, while a portion thereof is discharged through a line 15. Demisting aqueous solution may be charged to the scrubber 1 through line 14a.

The discharge from the wet scrubber 1 through line 15, which contains calcium and magnesium sulfites and sulfates is fed to an oxidizer 16 and air and/or oxygen fed to the oxidizer through line 17, with spent air discharged through line 18. In the oxidizer 16, magnesium sulfites are converted to magnesium sulfates while calcium sulfites are converted to calcium sulfates, such as gypsum (calcium sulfate dihydrate). During the oxidation, the crystalline lime inerts which are carried along with the lime slurry are converted to an amorphous state, a fluffy brownish or orangish-colored material that is very difficult to separate from the oxidizer effluent. The oxidized effluent is passed through line 19 to a separator 20, such as a primary hydroclone, with a solids portion, containing gypsum removed through line 21 and discharged, while the hydroclone overflow liquor may be passed through line 22, to a secondary separator, such as a hydroclone or clarifier 23, with further solids removed through line 23a and a by-product stream produced and discharged through line 24, which is a clarified oxidizing aqueous effluent containing magnesium hydroxide (generally about 20-30 weight percent solid density of >50 percent purity), and about 1-3 weight percent suspended solids, comprising amorphous lime inerts and gypsum fines. All of the lime inert material that enters the flue gas desulfurization system with the slaked lime used will exit the FGD process in this clarified oxidized effluent in line 24.

The clarified oxidized effluent from the separator 23 is passed through line 24 to a regeneration tank 25 and lime added thereto through line 26 in an amount sufficient to convert the magnesium sulfate to magnesium hydroxide and the amorphous inert material to a crystalline inert material, and produce a regenerator discharge containing magnesium hydroxide, gypsum and crystalline inert material. The regenerator discharge is passed through line 27 to a separator 28, such as a hydroclone, where a substantial amount of the gypsum, as a solid, is separated from the regenerator discharge. The separated gypsum is passed to a collector 29 through line 30, and the separated gypsum removed through line 31, and preferably recycled to the oxidizer 16. A separated magnesium hydroxide, residual minor amount of gypsum, and crystalline inert material stream is fed from the separator 28, through line 32, to an accumulation tank 33 that feeds to a solids concentrating system 34 such as a V*SEP® sold by New Logic Research, Inc. of Emeryville Calif., which contains a pair of stacked membrane filters. With such a device, one column operates for separation while the other remains on stand-by as a spare. The V*SEP® device has been found to be especially effective in concentrating both magnesium hydroxide and inert crystalline material in the separated magnesium hydroxide stream. Water from the concentration system is discharged through line 35 to a waste water treatment device 36 and discharged therefrom through line 37. The water from line 37 can be returned to the flue gas desulfurization system, such as for slaking of lime through line 38 or discharged from the system through line 39.

The concentrated solids stream is fed through line 40 to a return line 41 which leads to a collection tank 42, while a portion of the concentrated solids stream is returned to the magnesium-enhanced calcium slurry sulfur dioxide removal process, such as through line 43 to storage tank 9, and a remaining portion thereof may be passed through line 44 for use elsewhere in the method of removing sulfur dioxide from the flue gas stream.

For example, a preferred method returns a portion of the concentrated solids stream from line 44 to the oxidizer 16 through line 45. Or, a further remaining portion of the concentrated solids stream may be fed from line 44, through line 46 to a power plant boiler 47 of a combustion system 48 that produces the flue gas stream 12 being treated. The addition of the further remaining portion of the concentrated solids stream to the power plant boiler can be for either slag control within the boiler 47 or for reaction with and removal of sulfur trioxide therein, or other purposes. In another embodiment of the present method, a further remaining portion of the concentrated solids steam in line 44 can be fed to the flue gas stream in line 12 through line 49 at a location between a solids collection device 50, such as an electrostatic precipitator or baghouse, and the wet scrubber 1 to react with sulfur trioxide in the flue gas stream.

Figure 2:
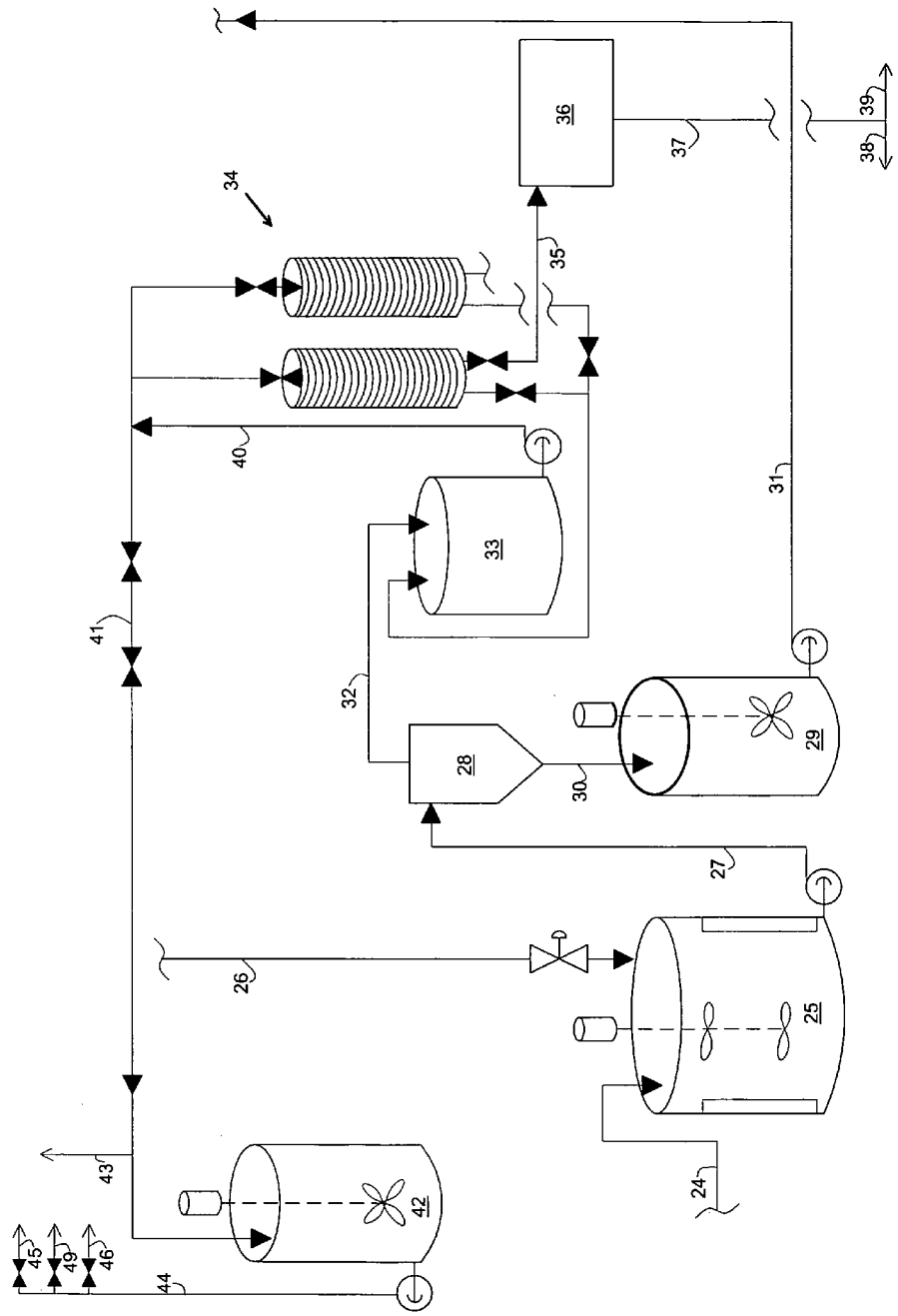
FIG. 2 is an enlarged flow diagram illustrating the present method of treating a bleed stream from a magnesium-containing portion of an oxidized effluent of a magnesium-enhanced calcium slurry sulfur dioxide removal process.

The following table is a material balance of the present method for treating a bleed stream from a magnesium-containing portion of oxidized effluent according to the present method, with stream numbers from the material balance indicated in FIGS. 1 and 2.

fates are formed, and the calcium sulfites and magnesium sulfites, following said contact, are oxidized in an oxidizer to produce an oxidized effluent containing magnesium sulfate and gypsum, along with said crystalline inert material which has been converted to an amorphous inert material, and the oxidized effluent passed to a separator to remove a major portion of the gypsum and produce a clarified oxidized effluent, the improvement comprising:

passing the clarified oxidized effluent to a regeneration tank and adding lime slurry thereto to produce a regenerator discharge containing magnesium hydroxide, gypsum and regenerated crystalline inert material;

passing the regenerator discharge to a separator where a substantial amount of gypsum is separated therefrom and a separated magnesium hydroxide stream is provided containing magnesium hydroxide, a residual minor amount of gypsum, and regenerated crystalline inert material;

passing the separated stream to a concentration system to produce a concentrated solids steam containing a mixture of magnesium hydroxide, residual minor amount of gypsum and regenerated crystalline inert material; and returning a portion of the concentrated solids stream to the magnesium-enhanced calcium slurry sulfur dioxide removal process while passing a remaining portion thereof to the oxidizer.

|  | MW | 24 | 26 | 27 | 32 | 30 | 41 | 35 | 37 | 43 | 31 |
|---|---|---|---|---|---|---|---|---|---|---|---|
| WATER lb./hr. | 18.02 | 185,650 | 15,100 | 198,172 | 176,039 | 22,133 | 16,573 | 159,457 | 159,457 | 10,703 | 22,133 |
| MgSO3 lb./hr. | 104.38 | 0 | — | — | — | — | — | — | — | — | — |
| Mg(HSO3)2 lb./hr. | 186.46 | 1 | — | — | — | — | — | — | — | — | — |
| MgSO4(1) lb./hr. | 120.38 | 5,809 | 12 | 171 | 152 | 19 | 14 | 138 | 138 | 9 | 19 |
| MgCl2 lb./hr. | 95.22 | 288 | 10 | 10 | 9 | 1 | 1 | 8 | 8 | 1 | 1 |
| CaCl2 lb./hr. | 110.99 | — | 2 | 327 | 290 | 37 | 27 | 263 | 263 | 18 | 37 |
| CaSO3*1/2H2O lb./hr. | 129.15 | — | 0 | 3 | 2 | 1 | 2 | — | — | 1 | 1 |
| CaSO4*2H2O lb./hr. | 172.18 | 169 | 318 | 8,551 | 1,710 | 6,841 | 1,710 | — | — | 1,104 | 8,841 |
| FLY ASH lb./hr. |  | 1 | 0 | 1 | 1 | 0 | 1 | — | — | 1 | 0 |
| CaCO3 lb./hr. | 100.08 | — | 32 | 32 | 6 | 25 | 6 | — | — | 4 | 26 |
| Ca(OH)2 lb./hr. | 74.12 | — | 3,096 | — | — | — | — | — | — | — | — |
| Mg(OH)2 lb./hr. | 58.32 | — | 358 | 3,260 | 2,868 | 391 | 868 | — | — | 1,852 | 391 |
| INERTS lb./hr. |  | 919 | 151 | 1,070 | 951 | 120 | 951 | — | — | 614 | 120 |
| TOTAL (LB/HR) |  | 192,838 | 19,080 | 211,596 | 182,029 | 29,510 | 22,154 | 159,875 | 159,875 | 14,799 | 29,567 |
| TOTAL SUSUPENDED SOLIDS lb./hr. |  | 1,069 | 3,955 | 12,916 | 5,538 | 7,378 | 5,538 | — | — | 3,700 | 7,378 |
| % TD SOLIDS |  | 3 | 0 | 0.24 | 0 | 0 | 0 | 0 | 0 | 0 | 0 |
| % TS SOLIDS |  | 1 | 21 | 6.1 | 3 | 25 | 25 | — | — | 25 | 25 |
| SP. GR. |  | 1.01 | 1.15 | 1.03 | 1.01 | 1.18 | 1.18 | 0.99 | 0.99 | 1.18 | 1.18 |
| LIQUID(GPM) |  | 381 | 33 | 411 | 361 | 50 | 37 | 324 | 324 | 25 | 50 |

The above material balance is projected for a magnesium-enhanced lime scrubbing process treating a flue gas stream at a gas flow rate of 904,000 scfm, using a lime slurry containing 3 percent magnesium.

The present process thus provides an improved method for removing sulfur dioxide from a flue gas stream and a method of treating a bleed stream from an oxidized effluent from a magnesium enhanced lime scrubbing process.

I claim:

1. In a method of removing sulfur dioxide from a flue gas stream of a power plant boiler by contact in a wet scrubber with an aqueous scrubbing slurry containing magnesium and calcium scrubbing components, and inert material in crystalline form, wherein calcium and magnesium sulfites and sul- 2. The method as defined in claim 1 wherein a further remaining portion of the concentrated solids stream is fed to the power plant boiler for reaction with sulfur trioxide therein.

3. The method as defined in claim 1 where a further remaining portion of the concentrated solids stream is fed to the power plant boiler for slag control.

4. The method as defined in claim 1 wherein a further remaining portion of the concentrated solids stream is fed to the flue gas stream at a solids collection device selected from an electrostatic precipitator and a baghouse to react with sulfur trioxide present in the flue gas stream upstream of the wet scrubber.

5. The method as defined in claim 1 wherein the calcium scrubbing component in the aqueous scrubbing slurry is lime.

6. The method as defined in claim 1 wherein the calcium scrubbing component in the aqueous scrubbing slurry is limestone.

7. The method as defined in claim 1 wherein the concentration system comprises stacked membrane filters.

8. In a method of removing sulfur dioxide from a flue gas stream of a power plant boiler by contact in a wet scrubber with an aqueous scrubbing slurry containing magnesium and lime, and inert material in crystalline form, wherein calcium and magnesium sulfites and sulfates are formed, and the calcium sulfites and magnesium sulfites, following said contact, are oxidized in an oxidizer to produce an oxidized effluent containing magnesium sulfate and gypsum, along with said crystalline inert material which has been converted to an amorphous inert material, and the oxidized effluent passed to a separator to remove a major portion of the gypsum and produce a clarified oxidized effluent, the improvement comprising:
passing the clarified oxidized effluent to a regeneration tank and adding lime slurry thereto to produce a regenerator discharge containing magnesium hydroxide, gypsum and regenerated crystalline inert material;
passing the regenerator discharge to a separator where a substantial amount of gypsum is separated therefrom and a separated magnesium hydroxide stream is provided containing magnesium hydroxide, a residual minor amount of gypsum, and regenerated crystalline inert material;
passing the separated stream to a concentration system, including stacked membrane filters, to produce a concentrated solids steam containing a mixture of magnesium hydroxide, residual minor amount of gypsum and regenerated crystalline inert material;
returning a portion of the concentrated solids stream to the magnesium-enhanced calcium slurry sulfur dioxide removal process while passing a remaining portion thereof to the oxidizer; and returning a further remaining portion of the concentrated solids stream to the power plant boiler.

9. In a method of removing sulfur dioxide from a flue gas stream of a power plant boiler by contact in a wet scrubber with an aqueous scrubbing slurry containing magnesium and lime, and inert material in crystalline form, wherein calcium and magnesium sulfites and sulfates are formed, and the calcium sulfites and magnesium sulfites, following said contact, are oxidized in an oxidizer to produce an oxidized effluent containing magnesium sulfate and gypsum, along with said crystalline inert material which has been converted to an amorphous inert material, and the oxidized effluent passed to a separator to remove a major portion of the gypsum and produce a clarified oxidized effluent, the improvement comprising:
passing the clarified oxidized effluent to a regeneration tank and adding lime slurry thereto to produce a regenerator discharge containing magnesium hydroxide, gypsum and regenerated crystalline inert material;
passing the regenerator discharge to a separator where a substantial amount of gypsum is separated therefrom and a separated magnesium hydroxide stream is provided containing magnesium hydroxide, a residual minor amount of gypsum, and regenerated crystalline inert material;
passing the separated stream to a concentration system to produce a concentrated solids steam containing a mixture of magnesium hydroxide, residual minor amount of gypsum and regenerated crystalline inert material;
returning a portion of the concentrated solids stream to the magnesium-enhanced calcium slurry sulfur dioxide removal process while passing a remaining portion thereof to the oxidizer; and returning a further remaining portion of the concentrated solids stream to the flue gas stream at a solids collection device, selected from an electrostatic precipitator and a baghouse, to react with sulfur trioxide present in the flue gas stream upstream of the wet scrubber.

10. A method of treating a bleed steam from a magnesium-containing portion of an oxidized effluent, of a magnesium-enhanced calcium slurry sulfur dioxide removal process, containing crystalline inert material, from an oxidizer, the oxidized effluent, after clarification, containing magnesium sulfate, and up to about three weight percent of amorphous inert material and gypsum fines, comprising:
passing the oxidized effluent to a regeneration tank and adding lime slurry thereto to produce a regenerator discharge containing magnesium hydroxide, gypsum and regenerated crystalline inert material;
passing the regenerator discharge to a separator where a substantial amount of gypsum is separated therefrom and a separated magnesium hydroxide stream is provided containing magnesium hydroxide, a residual minor amount of gypsum, and regenerated crystalline inert material;
passing the separated stream to a concentration system to produce a concentrated solids steam containing a mixture of magnesium hydroxide, residual minor amount of gypsum and regenerated crystalline inert material; and
returning a portion of the concentrated solids stream to the magnesium-enhanced calcium slurry sulfur dioxide removal process while passing a remaining portion thereof to the oxidizer.

11. The method as defined in claim 10 wherein a further remaining portion of the concentrated solids stream is fed to a power plant boiler for reaction with sulfur trioxide therein.

12. The method as defined in claim 10 where a further remaining portion of the concentrated solids stream is fed to a power plant boiler for slag control.

13. The method as defined in claim 10 wherein a further remaining portion of the concentrated slurry stream is fed to a flue gas stream at a solids collection device selected from an electrostatic precipitator and a baghouse to react with sulfur trioxide present in the flue gas stream upstream of the wet scrubber.

14. The method as defined in claim 10 wherein a calcium scrubbing component of the magnesium-enhanced calcium slurry in the sulfur dioxide removal process is lime.

15. The method as defined in claim 10 wherein a calcium scrubbing component of the magnesium enhanced calcium slurry in the sulfur dioxide removal process is limestone.

16. The method as defined in claim 10 wherein the concentration system comprises stacked membrane filters.

17. A method of treating a bleed steam from a magnesium-containing portion of an oxidized effluent, of a magnesium-enhanced lime slurry sulfur dioxide removal process, containing crystalline inert material, from an oxidizer, the oxidized effluent, after clarification, containing magnesium sulfate, and up to about three weight percent of amorphous inert material and gypsum fines, comprising:
passing the oxidized effluent to a regeneration tank and adding lime slurry thereto to produce a regenerator discharge containing magnesium hydroxide, gypsum and regenerated crystalline inert material;

passing the regenerator discharge to a separator where a substantial amount of gypsum is separated therefrom and a separated magnesium hydroxide stream is provided containing magnesium hydroxide, a residual minor amount of gypsum, and regenerated crystalline inert material;

passing the separated stream to a concentration system to produce a concentrated solids steam containing a mixture of magnesium hydroxide, residual minor amount of gypsum and regenerated crystalline inert material;

returning a portion of the concentrated solids stream to the magnesium-enhanced calcium slurry sulfur dioxide removal process while passing a remaining portion thereof to the oxidizer; and returning a further remaining portion of the concentrated solids stream to a power plant boiler.

18. A method of treating a bleed steam from a magnesium-containing portion of an oxidized effluent, of a magnesium-enhanced lime slurry sulfur dioxide removal process, containing crystalline inert material, from an oxidizer, the oxidized effluent, after clarification, containing magnesium sulfate, and up to about three weight percent of amorphous inert material and gypsum fines, comprising:

passing the oxidized effluent to a regeneration tank and adding lime slurry thereto to produce a regenerator discharge containing magnesium hydroxide, gypsum and regenerated crystalline inert material;

passing the regenerator discharge to a separator where a substantial amount of gypsum is separated therefrom and a separated magnesium hydroxide stream is provided containing magnesium hydroxide, a residual minor amount of gypsum, and regenerated crystalline inert material;

passing the separated stream to a concentration system to produce a concentrated solids steam containing a mixture of magnesium hydroxide, residual minor amount of gypsum and regenerated crystalline inert material;

returning a portion of the concentrated solids stream to the magnesium-enhanced calcium slurry sulfur dioxide removal process while passing a remaining portion thereof to the oxidizer; and returning a further remaining portion of the concentrated slurry stream to a flue gas stream at a solids collection device selected from an electrostatic precipitator and a baghouse to react with sulfur trioxide present in the flue gas stream upstream of the wet scrubber.

* * * * *